Feb. 3, 1970     C. G. CANNON ET AL     3,492,803
PROCESS AND APPARATUS FOR MAKING YARNS OF POLYMERIC MATERIAL
Original Filed June 7, 1965     6 Sheets-Sheet 1
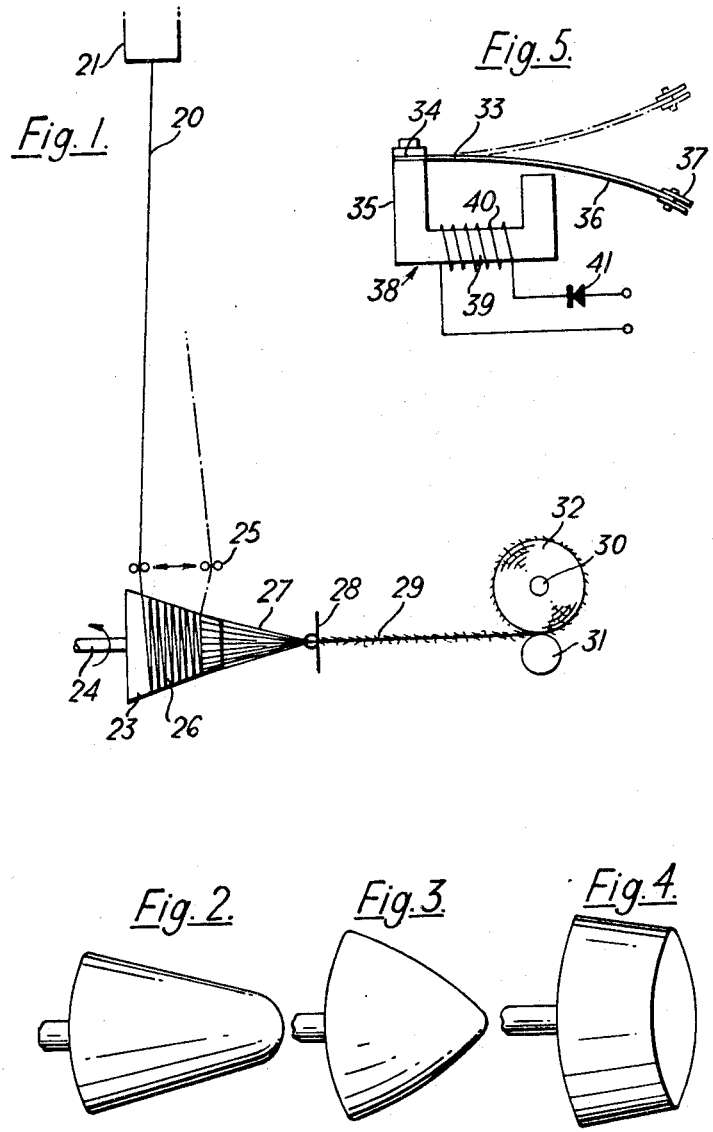
Inventors
Cyril George Cannon
Alan Selwood
Barry Linton Davies
Roy Alan Williams
By Cushman, Darby & Cushman Attorneys

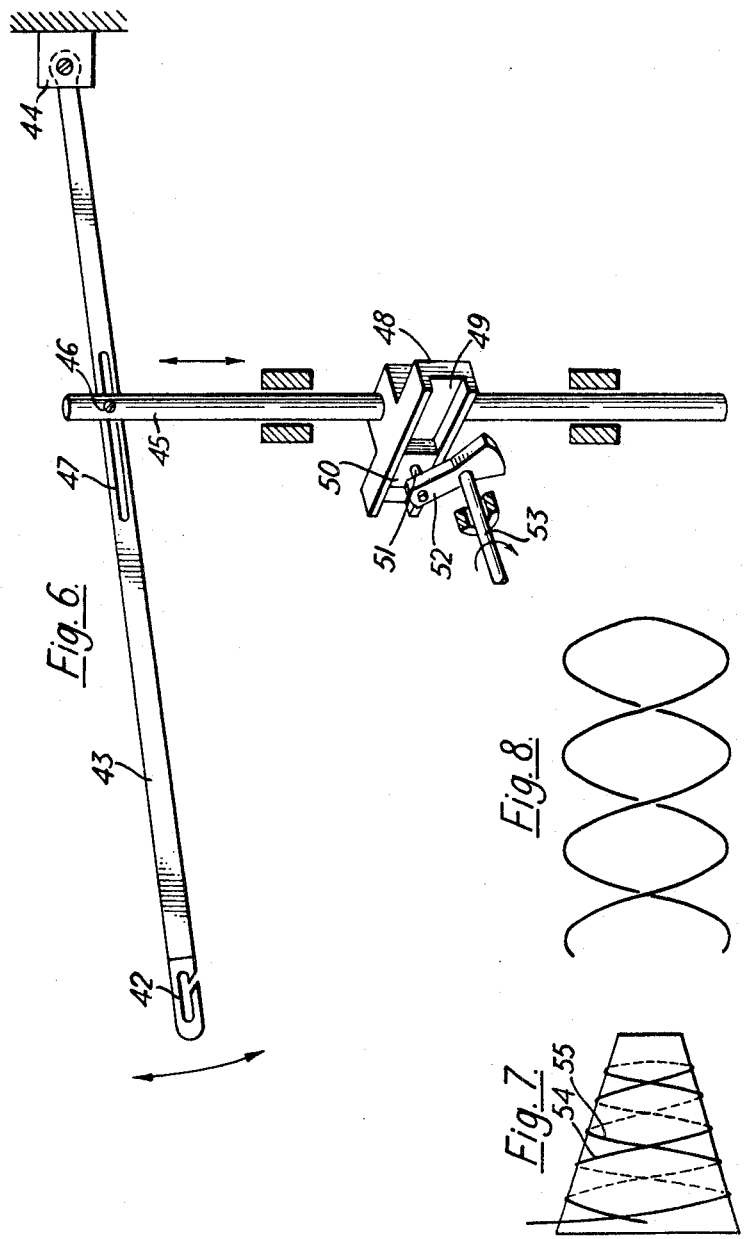

United States Patent Office 3,492,803
Patented Feb. 3, 1970

3,492,803
PROCESS AND APPARATUS FOR MAKING
YARNS OF POLYMERIC MATERIAL
Cyril G. Cannon, Usk, Alan Selwood, Llanyravon, Cwmbran, Barrie L. Davies, Langstone, and Roy A. Williams, Llansapley, England, assignors to British Nylon Spinners Limited, Pontypool, Monmouthshire, England
Original application June 7, 1965, Ser. No. 461,617. Divided and this application Nov. 16, 1967, Ser. No. 708,738
Claims priority, application Great Britain, June 10, 1964, 24,087/64
Int. Cl. D01h 7/02, 13/26; D02g 3/02
U.S. Cl. 57—59                             5 Claims

ABSTRACT OF THE DISCLOSURE

A process for making a yarn by extruding a synthetic polymeric material forming continuous filaments, the formed filaments passing and being wrapped around a rotating body having a peripheral speed which is sufficient to apply tension and to attenuate the continuous filament, with reciprocating movement of at least 600 cycles per minute being imparted to the filament during the passage to the body, so that the filament is moved back and forth along the rotating body to form a sleeve. The sleeve is continuously withdrawn from the body, in a direction parallel to its axis of rotation, and at a speed less than the peripheral speed of the body, so that tension is inserted, with means being provided to collect the yarn so obtained.

This is a division of application Ser. No. 461,617, filed June 7, 1965.

This invention relates to yarns containing one or more continuous filaments of an artificial polymeric material, and to a process and apparatus used for making such yarn.

Filaments of an artificial polymeric material are most conveniently manufactured in the form of continuous filaments, by wet, dry or melt-spinning processes. These continuous filaments, as conventionally made, are essentially straight and with a marked regularity. In yarns derived from such continuous filaments, these qualities facilitate the close packing of adjacent filaments so that the yarn is a relatively dense and compact structure. This compactness is reflected in several undesirable properties manifest by such continuous filament yarns, for instance, a poor covering power, poor heat insulation, a low degree of bulkiness and a somewhat cold handle, and these detract from the recognised excellent strength. In contrast, with continuous filament yarns those derived from staple length fibres have a relatively low strength but a better developed covering power, heat insulation and bulkiness, and a softer handle, it being generally accepted that the properties are owed to the presence therein of irregular length fibres and numerous discontinuities.

During the past decade or so, much research effort, as evinced by numerous publications, including many patent specifications, has been directed to imparting some of the desirable qualities of a spun staple fibre yarn to a continuous filament yarn, and many methods and devices have been proposed for modifying a continuous filament yarn to achieve this end.

These modified continuous filament yarns are typically made by processes which involve treating a filamentary bundle to crimp, loop or otherwise disperse, individual filaments therein and they are not ordinarily prepared in an operation fully integrated with the extrusion and making of the constituent continuous filaments.

One reason which may be advanced to account for this concern is the high linear speed of the extruded filaments, which is of the order of 4,000 feet per minute in the case of polyamide or polyester filaments. This high speed makes it difficult to treat the travelling filaments in an appropriate manner. Another reason is connected with the nature of many freshly spun filaments which, because of their low molecular orientation are generally of poor strength and consequently are not suited for many textile purposes.

This invention is directed to novel continuous filament yarns which are made from one or more continuous filaments in an operation which is fully integrated with the extrusion and formation of the constituent continuous filament or filaments.

Accordingly, the present invention has for one of its objects the provision of novel continuous filament yarns which simulate in certain respects notably in their bulk and covering power a staple fibre yarn spun from comparable fibres and containing an approximately equivalent number of fibres in their cross-section.

The present invention has for another of its objects the provision of a process for making novel continuous filament yarns by collecting one or more freshly extruded continuous filaments and assembling them directly into a yarn.

Another object of the present invention is to provide suitable apparatus for practicing the above process.

Other objects of the invention will become apparent in the course of the following description and claims, and by reference to the accompanying drawings.

According to the present invention, we provide a continuous filament yarn which comprises a multiplicity of interconnected segments extending in a generally axial direction with a progressive advancement of segments along the axis, and with a majority of the segments contained for at least part of their length with another segment, said segments being twisted into a stable structure.

In a modified form of the continuous filament yarn of this invention, pedicled bights emerge from the axially-extending segments and extend outwardly therefrom.

The number and arrangement of these pedicled bights may vary considerably. However, two general arrangements can be recognized and distinguished.

In one, the pedicled bights are not numerous in relation to the axially-extending segments and they are wrapped loosely around the segments to form a generally discontinuous binding of helically twisted loops along the segments.

In another arrangement which our experience has shown to be that most commonly obtained in practicing the process of this invention, the pedicled bights are numerous and they extend outwardly from the axially-extending segments along their length in a more or less random array. A yarn in which this arrangement is present comprises a distinct relatively compact core and a less compact peripheral region. The core is formed of a multiplicity of the interconnected segments extending in a generally axial direction with a progressive advancement of segments along said axis, and with a majority of the segments contained for at least part of their length within another segment.

The peripheral region in such a yarn is constituted by the pedicled bights which emerge from the core and extend outwardly therefrom in a random array.

In the modified yarn of this type the twist which imparts stability and coherency in the yarn is predominantly contained in the core.

The present invention further provides a process for making a yarn which comprises forming a continuous filament by the extrusion of a polymeric material, passing the continuous filament so formed to a rotating body around which the filament is wrapped, and having a peripheral speed which is sufficient to apply tension to, and to attenuate the continuous filament being passed thereto, imparting to the filament in the course of its passage to the body a reciprocating movement whereby the filament is assembled around the body in the form of a sleeve, continuously withdrawing the sleeve from the body in the direction of its axis of rotation and at a speed less than the peripheral speed of the body so as to insert twist, and collecting the yarns so obtained in an orderly manner.

While the formation of a fully continuous filament yarn from only one filament is a noteworthy point about the process of this invention, and the use of one filament may be desirable on economic grounds or to provide a yarn which has a desired final denier many more filaments than one, may simultaneously be passed to the rotating body and assembled directly into a continuous filament yarn.

As the denier of the continuous filament yarn increases with the number of fialments constituting it, there is an upper limit on the number of filaments which can be assembled into a yarn compatible with the formation of a yarn acceptable for normal textile purposes.

For most purposes, the number of filaments being simultaneously passed to the rotating body does not exceed 50, although this will vary somewhat according to the actual denier of the filaments.

The present invention also provides an apparatus for making a yarn which comprises means for extruding a polymeric material into one or more continuous filaments, a traverse mechanism located some distance away from the extrusion means and arranged to impart a reciprocating movement to the filament, a body arranged to rotate with a peripheral speed sufficiently high to apply tension to the filament and to assemble the filament around it in the form of a sleeve, and means for withdrawing the sleeve at a slower speed than the peripheral speed of the rotatable body and for collecting the yarn so obtained.

The term "continuous filaments" as used herein and in the claiming clauses hereof refers to filaments which are of an indefinite length and which in the practise of the process of this invention are continuously supplied by extrusion from a source of the polymeric material. The term does not include short length fibres, commonly referred to as staple fibers.

In a preferred way of putting into practice this invention, continuous filaments are extruded through the orifices in a spinneret from a source of the polymeric material and one or more of the continuous filaments are passed along a generally defined path, most usually downwards, until they have substantially completely solidified, when they are lead through a traverse mechanism and then onto the rotating body around which the filamets are wrapped in the form of a sleeve comprising a number of overlaid and interconnected helices.

Withdrawal of the sleeve along the axis of rotation or in a direction parallel thereto at a speed less than the peripheral speed of the body, provides the yarn which is collected in an orderly manner.

The sleeve whilst it is continuously propagated by the filaments being passed to the rotating body, is also continuously pulled off the body in a progressive and controlled manner, so that the sleeve can be regarded as a transient assembly of wrapped filaments.

The rotating body may have a variety of shapes although it is preferred that it should be profiled so as to taper in the direction in which the sleeve is moved thereof, for this faciltates the withdrawal of the sleeve as a coherent, integrated structure which is so important in conveying to the yarn some of its characteristic features. Particularly suitable rotating bodies are those which have a configuration described by a straight line generator. Examples include bodies which are conical or frusto-conical or essentially cylindrical in shape. In the context of cylindrically shaped bodies we mention that there has been used with conspicous success a body of cylindrical form which tapers ever so slightly (an angle of about 5°) toward the direction in which the sleeve is moved off it.

Bodies of essentially hemispherical or parabolic shape may also be employed in the process of this invention.

The body may be constructed of metal, plastic, ceramic or any other suitable material. Conveniently, the body is provided with an integral shaft for connection to a suitable drive means.

The peripheral speed i.e. surface speed, of the rotating body around which the filament is wrapped in the form of superimposed and interconnected helices, must be of a magnitude such that the body imparts tension to the filament passing thereto. The application of tension to the filament by the rotating body attenuates it in the distance between the spinneret face and the point where the filament is substantially completely solidified. Furthermore, under the impetus imposed by the rotating body, the filament is accelerated as it passes to the body. Accordingly, the spinning speed of the filament, which is the speed of the filament at a point after solidification is substantially complete and attenuation with a reduction in denier of the filament has well-nigh ceased, is directly dependent upon the peripheral speed of the rotating body. Hence, the spinning speed of the filament can be controlled in a direct and effective manner. Filaments of certain polymeric materials, particularly filaments derived from synthetic organic polymeric materials such, for example, as polyamides, polyesters, polyhydrocarbons, polyurethanes, polycarbonates and the like, are macromolecularly oriented as well as attenuated and accelerated by the rotating body. The degree of orientation developed in the freshly spun filaments is related to the peripheral rotational speed in the sense that the greater the speed, up to a certain variable limit, the more effective the orientation. Consequently, when synthetic organic polymeric materials are utilized in this invention, spinning and drawing can be accomplished in a single operation and the yarn formed from the sleeve withdrawn from the rotating body will contain drawn continuous filaments.

The effect of different peripheral speeds on the attenuation, acceleration and where appropriate macromolecular orientation, of filaments passing to the body, will be more fully described at a later passage in this specification, but we point out at this stage that peripheral speeds of less than 7,000 feet per minute are generally associated with yarns of somewhat inferior properties to those which are obtained using bodies with a higher speed, and the spinning speed of the filaments is correspondingly low thereby resulting in a generally poor productivity.

As the traverse mechanism, there may be employed any device capable of imparting to the travelling filament a reciprocating, to-and-fro motion in a manner which speeds the filament along the length of the rotating body in a series of superimposed and interconnected helices. Particularly suitable traverse mechanism are those wherein the filament passes through a thread guide contained in a traverse bar to which a reciprocating movement is imparted by mechanical, hydraulic, electromagnetic or other suitable means.

The desirably high peripheral speeds for the rotating body impose a lower limit on the traverse speed consistent with the satisfactory operation of the process and the formation of a yarn with good properties. This lower limit for the traverse speed varies over a wide range in dependence upon a number of variable factors including the peripheral speed of the rotating body. It is preferred to use traverse speeds which are high relative to those normally employed in the winding of continuous filaments into packages in a continuous filament spinning machine. In the latter role, the traverse speed does not ordinarily exceed much above 500 cycles per minute. In contrast thereto, the traverse speeds which in this invention are conducive to the smooth operation of the process and the formation of a yarn with maximum utility, are generally over 600 cycles per minute and preferably over 1000 cycles per minute, when the traverse mechanisms are used in conjunction with rotating bodies having peripheral speeds between 7,000 and 20,000 feet per minute.

Somewhat lower traverse speeds are acceptable when the peripheral speed of the rotating body is less than 7,000 feet per minute.

The invention will be more readily understood by referring to the attached drawings wherein:

FIGURE 1 shows a schematic representation of an apparatus assembly useful in practicing the invention;

FIGURES 2–4 show perspective views of differently shaped bodies which may be used as the rotatable body in the apparatus of FIGURE 1;

FIGURE 5 shows in plan view one traverse mechanism which may be used in the apparatus of FIGURE 1;

FIGURE 6 shows an alternative traverse mechanism which may be used in the apparatus of FIGURE 1;

FIGURE 7 is a diagrammatic representation of the configuration adopted by a filament when wrapped as a layer around the rotatable body;

FIGURE 8 is a developed plan of the configuration shown in FIGURE 7;

Figure 9:
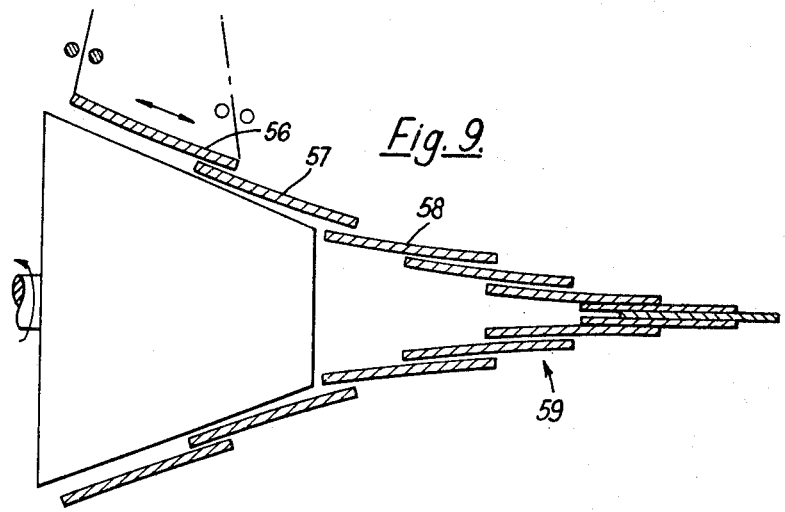
FIGURES 9–10 are diagrammatic and essentially idealised views which illustrate the structure of the sleeve which is built up around the rotatable body and the relationship between various layers therein both on the body and as the sleeve moves off it in a direction along the axis of rotation.

Referring to FIGURE 1, a freshly formed continuous filament indicated by reference numeral 20, is extruded through an orifice (not shown) in a spinneret 21 into room temperature air. The extruded filament after cooling and solidifying in the course of its downward passage through the air is wrapped around the continuous surface of a body 23 which is in the form of a truncated cone. The body 23 contains an integral shaft 24 which is connected to a suitable drive mechanism (not shown) by means of which the body is rotated. The peripheral speed i.e. surface speed of the rotating body, which will hereinafter for convenience be referred to as a godet, is sufficiently high for the purpose of applying tension to the filament and thereby to attenuate it during its passage between the spinneret and the godet. The continuous filament during its downward travel is passed through the thread guide (not shown) of a traverse mechanism, generally indicated by reference numeral 25, which is located a short distance above the godet surface. The traverse mechanism imparts to the travelling filament a reciprocating, to-and-fro movement in a plan normal to the mean direction of filament travel and parallel to the longitudinal axis of the godet 23. As a result of the reciprocating movement imparted to it, the filament is wound back and forth across the surface of the godet, from the skirt to the hose thereof, and a series of interconnected helices, which accumulate thereon in the form of a tapered tubular sleeve 26. The sleeve while being propagated by the wrapping of the continuously advancing filament is progressively pulled down the inclined surface of the godet in the direction of its axis of rotation by means of a conventional wind-up arrangement.

As the sleeve moves away from the godet surface around which it was formed it collapses, while simultaneously, under the influence of the pulling force exerted by the wind-up means, it is extended in the axial direction. The summation of these two effects provides a strand 27 of long interconnected loops which constitute the axially-extending segments in the yarn structure obtained from the strand. The rotary movement of the godet inserts twist in the strand as it is withdrawn along the axis of rotation. The insertion of twist commences in the region where the sleeve departs from the godet surface and runs down the strand for a variable distance, often until a twist barrier is encountered. The ceramic guide ring 28 through which the strand 27 is passed constitutes such a twist barrier and it is observed that in most instances the twist is almost entirely imparted prior to the passage of the strand therethrough. The yarn 29 so obtained is wound up as a tapered end package on a conventional wind-up arrangement using a traverse mechanism (not shown). As illustrated, the yarn is laid on a bobbin 30 surface driven by roller 31 to form a yarn package 32.

The speed of the yarn take up bobbin which effectively controls the rate at which the sleeve is pulled off the godet 23, is always much less than the rotational speed of the godet. Its speed is always maintained constant during a given operation and it is coordinated with the rotational speed of the godet, in accordance with requirements, for instance, twist level, for the yarn.

The godet around which the filament is wrapped as a sleeve and which applies tension to the filament thereby continuously pulling it down onto itself at a speed which is faster than the extrusion speed, is usually profiled so as to slope downwards in the direction along which the sleeve is withdrawn for then its orderly removal as a coherent, integrated structure is facilitated.

FIGURES 2–4 show perspective representations of actual godets that have been successfully used in this invention in the apparatus shown in FIGURE 1.

Each of the godets is a hollow lightweight construction with a continuous surface and is made of a high tensile strength aluminium alloy.

The shaft which is integral with the godet serves to attach it to a suitable drive, conveniently an electric motor, by means of which it is rotated.

The frusto-conical godet of FIGURE 2 has the following dimensions:

|  | Inches |
|---|---|
| Maximum diameter | 3¼ |
| Minimum diameter | 1¼ |
| Length along axis | 3⅛ |
| Angle of declination, 19°. | |

The bullet-nose godet of FIGURE 3 has the following dimensions:

| | Inches |
|---|---|
| Maximum diameter | 3 |
| Minimum diameter | 1⅛ |
| Length along axis | 2 |

Angle of declination, 30°.

The slightly tapered essentially cylindrical godet of FIGURE 4 has the following dimensions:

| | Inches |
|---|---|
| Maximum diameter | 2⅞ |
| Minimum diameter | 2⅛ |
| Length along axis | 1⅛ |

Angle of declination, 4°.

The directional location of the godet relative to the spinneret is not critical and the process can be operated with the godet positioned on the same vertical line as the godet or off-set therefrom.

In terms of distance from the sipnneret the godet should be located beyond the point where the downwardly traveling filament has substantially completely solidified otherwise the disruption of the filament into discontinuous staple length fibres may occur when the filament contacts the godet and when more filaments than one are being pulled down onto the godet fusion between adjacent filaments may result because of inadequate quenching time. In the particular case of filaments derived from mult-spun polymers, for instance, synthetic organic polymers such as polyamides, polyesters, polyhydrocarbons, polycarbonates and the like, the godet should be located beyond the region along the length of the extruded filament wherein the solidifying filament is in a highly transitional plastic state between the liquid and the solid states. Attenuation of the filament is effected predominantly in this region for the stress imposed by the godet carries back along the filament and localises the attenuation in that region. In this transitional region the filament can be seen to accelerate and become taut, moving along its length at high speeds. The optimum location for the godet is determined by simple experiments which involve altering its position until it attenuates the filaments well but does not disrupt the filaments or cause them to fuse together. In the case of polyhexamethylene adipamide, polyethylene terephthalate and polypropylene filaments the godet may be positioned anywhere between 18 inches and 10 feet beneath the spinneret orifices.

When operating with filaments derived from synthetic organic polymers such as the polymer species listed hereinbefore, the peripheral speed of the godet should be sufficiently high to macromolecularly orient the filaments as well as to attenuate them.

The peripheral speed required to attenuate and orient the filaments to the desired extent, which speed is related to the design characteristics of the godet, its dimensions and speed of rotation, will vary accordingly to the polymer being spun and process conditions such as emergent viscosity of the polymer i.e. the melt viscosity at the time of extrusion, the rate of the extrusion and the linear distance between the spinneret face and the godet.

With respect to polyhexamethylene adipamide, polyethylene terephthalate and polypropylene filaments a reasonable degree of macromolecular orientation, as evinced by birefringence measurements and properties such as tenacity can be attained at peripheral speeds over 7,000 feet per minute. Peripheral speeds of below 7,000 per minute result in low tenacity filaments of limited utility. The tenacity of filaments can be improved by stretching the yarns containing them but since this involves the addition of a further process step it is preferred to employ higher peripheral speeds and collect drawn filaments into the yarn. Above 7,000 feet per minute, the periphereal speed can be increased until excessive filament breakage occurs. The maximum peripheral speed which can be utilized without excessive filament breakage is primarily set by the extrusion rate. When excessive filament breakage at the spinneret occurs at a particular peripheral speed, then this can be minimized and the peripheral speed rendered practicable by using higher extrusion rates.

The better developed macromolecular orientation resulting from the higher peripheral speeds is associated with a decrease in the filament denier and consequently a compromise has to be reached between orientation and filament denier. With polymers such as polyhexamethylene adipamide, polyethyleneterephthalate and polypropylene, peripheral speeds of 9,000–20,000 feet per minute result in filament deniers of between 1.2–5 depending primarily upon the extrusion rate. Since filaments having a denier of less than 1 are not of great utility, this denier reduction also imposes an upper limit on the peripheral speed of the godet.

High peripheral speeds for the godet although essential for the most satisfactory operation of the process when melt-spun macromolecularly orientable synthetic organic polymers are used as the filament source, are also advantageously employed with other polymeric materials. This is so, because of the equivalency between the peripheral speed and spinning speed.

Hence, high peripheral speeds are associated with enhanced productivity and the attainment of an econnomically favourable process.

Since the peripheral speed of the godet is determined by its dimensions, in particular its diameter in the region where the filament is lead around the godet, and its rotational speed, a given peripheral speed can be attained either by rotating a relatively small godet at a comparatively high speed or by rotating at a slower speed a larger body. Thus, considering the godet shown in FIGURE 4. At a rotational speed of 20,000 revolutions per minute, its peripheral speed at the skirt where its diameter is 2⅞ inches is approximately 15,000 feet per minute. An equivalent peripheral speed could be obtained by using a godet of a similar cylindrical shape, but having a diameter of 6 inches by rotating it at 9,500 revolutions per minute. The use of a relatively large godet to attain a high peripheral speed as associated with certain difficulties. For instance, as the length of the axially-extending segments in the yarn is directly related to the length of the filament laid around and along the godet in a single traverse, the yarn which is derived from the sleeve withdrawn from a large godet (large length and/or large diameter) tends to contain long segments and this has a deleterious effect upon the structure of the yarn and the properties possesed by it. Furthermore, difficulties may be experienced in withdrawing the sleeve from the godet in an orderly and progressive manner. Additionally, a large body will have a lower bursting speed and it will occupy a greater amount of the limited space beneath a spinning station than a smaller body.

For these, and other reasons, it is preferred to obtain the desired high peripheral speeds by the rotation of a relatively small godet at a high speed. The use of high rotational speeds for the godet is also advantageous in a manner which will be explained more fully hereinafter, from the standpoint of the necessary insertion of twist in the strand of loops derived from the sleeve withdrawn from the godet.

By way of affording a more comprehensive appreciation of the expression "relatively small godet" there has been detailed herein the dimensions of the godets shown in FIGURES 2–4.

The rotation of these godets at 18,000 r.p.m. gave peripheral rotational speeds at the skirt of 15,290, 14,130 and 13,570 feet per minute respectively, and this was sufficient when melt-spun synthetic organic polymers were being processed to impart a useful degree of macromolecular orientation.

These godets were found to be adequate for the collection in the form of a sleeve of up to 25 filaments having deniers of up to six, and the sleeve would readily be withdrawn therefrom in an orderly and progressive manner.

The upper limit on the godet dimensions compatible with the orderly and progressive removal of the sleeve and the formation of the most satisfactory yarn depends upon factors such as the godet profile, the rotational speed and the traverse speed, but with godets of a large diameter there is an increasing propensity for "snatching" of the sleeve during its withdrawl: "snatching" results in the formation of a slub yarn of an irregular denier and consequently of limited utility and also the frequent breaking of filaments with the interruptions of the process.

As previously mentioned, the downwardly travelling filament is lead through a traverse mechanism which imparts a reciprocating motion to the filament so as to spread it out over the surface of the godet in the form of a sleeve comprising a series of interconnected and superimposed helices, the traverse mechanism being located a short distance above the godet. It it is positioned too far away from the godet then there is some loss in the effectiveness of the traverse device in spreading the filament over the surface thereof, while, if it is too close to the godet then difficulties may be encountered in stringing-up the apparatus. The optimum location for the traverse mechanism is determined by shifting it away from the godet until the stringing-up of the apparatus can be effected without difficulty. When operating with traverse mechanisms of the type wherein the filament is passed through a thread guide contained in a traverse bar which is reciprocated by mechanical, hydraulic, electromagnetic or other similar means, and using the godet shown in FIGURES 2–4, this optimum distance is between 1 and 6 inches above the godet, and most commonly 1.5 to 4 inches above it.

For the most satisfactory operation of the process of this invention it is desirable that the traverse mechanism should have a traverse speed which is high relative to the traverse speeds ordinarily employed in the winding of continuous filaments into packages in a continuous filament spinning machine. One traverse device which can move the filament back and forth along the godet at high speed, and that is suitable for use in the apparatus of FIGURE 1, is shown in plan view in FIGURE 5.

Referring to that figure, the traverse mechanism comprises a thin metal traverse bar 33, one end 34 of which is clamped to an end of a U-shaped iron block 35 and the other end 36 carries a light two-pronged filament guide 37 constructed of two $\frac{1}{16}$ inch diameter and $\frac{1}{2}$ inch long ceramic pins. The iron block 35 serves as the core of an electromagnet, indicated generally by reference numeral 38, and the nexus 39 thereof is surrounded by a wire wound into a coil 40 which is connected through a variable transformer to a source (neither of which are shown) delivering 50 cycles of alternating current per second. A silicon diode rectifier 41 is connected in series with the coil of the electromagnet so as to pass only alternate half cycles of current. The flux induced in the iron core 35 imparts a reciprocating motion to the cantilever traverse bar 33 which is tuned to move back and forward at the desired speed of 50 cycles per second by adjustment of its free length. The traverse is sinusoidal in character with an amplitude (peak-peak) of approximately 1.5 inches.

FIGURE 6 shows an alternative high speed traverse mechanism, which is mechanical rather than electrical in operation, and which may be used in the apparatus of FIGURE 1.

In its essential form, this traverse mechanism comprises an arrangement for converting the rotary motion of a crank into rectilinear movement, the latter operating on a traverse bar via a connecting rod, and it utilises a Scotch yoke to eliminate the irregularity of motion, common to all ordinary crank devices. Referring to the figure, the filament being passed to the godet is carried through a ceramic thread guide 42 attached to one end of a light tubular steel traverse bar 43 which is pivotally connected at its other end to a bracket 44. The traverse bar is also secured to a connecting rod 45 by a pin 46 which can move in a longitudinal slot 47 in the traverse bar. It will be apparent from an inspection of the FIGURE 6, that if the connecting rod is reciprocated, a like motion will be imparted to the traverse bar. To secure the reciprocating action, the connecting rod is rigidly secured to a cross-head 48, which contains a slot 49 within which there is located a slidable block 50. The block is connected through a crank pin 51 to a crank 52 attached to one end of an axle 53 which is rotated at a uniform speed by an electric motor controlled by a variac transformer (neither of which are shown). Thus, by means of the rotating crank, a continuous reciprocating motion is transmitted through the connecting rod to the traverse bar which in moving back and forth describes an arc. On account of its simplicity, this traverse mechanism is reliable in operation and is capable of attaining traverse speeds of up to about 100 cycles per second. The traverse is essentially sinusoidal in character and its speed can readily be altered and the amplitude adjusted, the latter in accordance with the length of the godet along which the filament is wrapped.

In operation, the traverse bar in the mechanisms shown in FIGURES 5 and 6, is positioned in a horizontal plane essentially at right angles to the long axis of the godet so that the filament passing through the thread guide is traversed back and forth along the length of the godet.

Traverse mechanism other than the two shown may be employed and it is not necessary that the reciprocating movement be imparted to the filament by its passage through a thread guide contained in a displaceable traverse bar. For instance, the traverse mechanism may be pneumatic in operation with the filament passing through a device wherein it is subjected to a transverse stream of air the direction of which is rapidly and continuously alternated.

A similar effect may be obtained electrostatically by passing the filament between two plates the polarity of which is rapidly and continuously reversed.

Due to the axial movement imparted to the filament by the traverse mechanism, and also the rotary movement of the godet, the filament is wrapped around the godet in a series of interconnected and superimposed helices which form an approximately tubular sleeve around the godet.

FIGURE 7 is a diagrammatic representation of the configuration adopted by a filament wrapped around the godet in one complete traverse cycle. Initially, the filament advances along the godet in one direction as a right-hand helix 54. At the point X, which corresponds to the extreme right-hand end of the traverse cycle, there is a reversal of the direction in which the filament moves along the godet, and a second helix 55, in this instance a left-hand helix, which overlies the first helix, is formed. Both helices contain the same number of turns and are of the same length which approximately corresponds to the traverse amplitude. The structure derived from a single complete traverse comprises the two interconnected and superimposed helices, 54 and 55, of opposite hand, although generated in the same rotational direction. This double helical structure constitutes one layer of the sleeve which is built up on the godet and for convenience in this specification the term "layer" will be used in reference to the double helical structure formed from one complete traverse.

A layer, when projected onto a plane surface, as in the developed plan shown in FIGURE 8, describes a series of linked curves, the configuration of which is similar to certain kinds of "lissajous figures" known in mathematics. The configuration of the filament within a layer is reflected in the structure of the axially-extending segments in the yarn as will be explained in more detail hereinafter.

The characteristic structure of the yarn of this invention and the properties manifest by it, are dependent upon the formation on the godet of a transient assembly in the form of a sleeve constructed of a plurality of layers each derived from a single traverse, and the orderly and progressive withdrawal of the sleeve from the godet.

When the advantageous high peripheral speeds are employed for the godet, the formation of such a sleeve, assuming that there is the usual slow withdrawal speed, is dependent upon a high speed of traverse in the traverse mechanism.

Moreover, the helical angle within the layer is determined by the peripheral speed of the godet, the godet profile and the traverse speed at which the traverse mechanism operates, and a high traverse speed is reflected in a relatively large helical angle. When using the traverse mechanism of FIGURE 6 with a traverse speed of 80 cyles per second and the godet of FIGURE 4 with a peripheral speed of 15,000 feet per minute, the filaments at the mid-point of the traverse crossed at an angle of 18°.

A high value for the helical angle enhances the frictional interconnection between successive layers end between the two helices of the same layer and aligns the turns of the helix into positions more suitable for withdrawal.

The minimum traverse speed compatible with the formation of a satisfactory yarn and the smooth operation of the process depends on the design characteristic of the godet, its dimensions, its peripheral speed, the speed at which the sleeve is withdrawn from the godet and like variable factors. With respect to the traverse mechanism of FIGURES 5 and 6 when used with the godets shown in FIGURES 2–4 and other godets of similar dimensions operating at peripheral speeds of between 7,000 and 20,000 feet per minute, and with the sleeve being withdrawn at a rate of up to 500 feet per minute, the traverse speed can be varied over a wide range above 600 cycles per minute, preferably above 1,000 cycles per minute. Traverse speeds below 600 cycles per minute are associated with frequent breakdowns in the process and result in a slubbed yarn of irregular denier and consequently of limited utility. With peripheral speeds of less than 7,000 feet per minute, the traverse speed can be correspondingly less than 600 cycles per minute and still produce a reasonably uniform yarn of good properties.

To obtain the desired yarn from the approximately tubular sleeve which forms around the godet, it is necessary as a first step, progressively to remove layers from within the sleeve. This is accomplished by pulling by means of the wind-up device, the narrow end of the sleeve in a direction along the axis of rotation of the godet or essentially parallel thereto. Layers within the sleeve are generally moved away in the order in which they were assembled around the godet. However, because of the good frictional interaction and coherency between adjacent layers. attributable to the high traverse speeds employed, a tractive effect is exerted by a given layer, as it moves, on successive layers so that the entire sleeve advances down, and away from, the inclined surface of the godet, as an integrated structure. The sleeve is essentially a transient assembly, for although it is continuously propagated by the deposition of additional layers around its otuer surface it is continuously and simultaneously diminished by the withdrawal of layers from the interior thereof. Once the withdrawal of layers has been commenced, and provided a constant wind-up speed is maintained, an equilibrium state is attained between the accumulation of layers within their sleeve and their withdrawal as a strand of loops. The sleeve present on the godet after the commencement of the withdrawal of layers comprises a plurality of layers arranged in a superimposed array but with successive layers disposed in a staggered relationship to one another.

Figure 10:
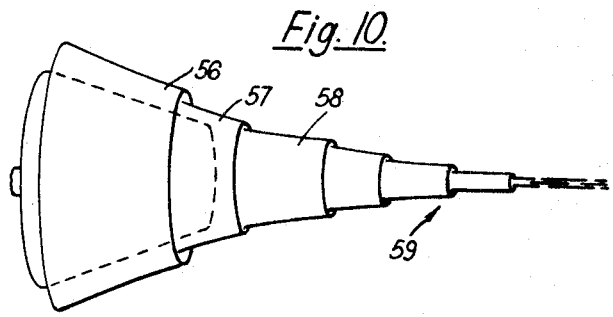

FIGURES 9 and 10 show in a diagrammatic and idealized manner, the relationship between successive linked layers on the godet and they illustrate phenomena which occur during the removal of the sleeve from the godet and its collapse into a strand of loops.

In the diagrammatic cross-sectional view of FIGURE 9, a newly deposited layer 56 overlaps the layer 57 deposited immediately previously but which, in the interval of the time after its formation, has moved down the inclined surface of the godet under the tractive effect exerted by layer 58 which has moved completely off the godet surface.

In the cross-sectional view shown in FIGURE 9 the sleeve, of which only two layers are depicted, is a togulated structure with the interconnected layers arranged on top of one another but with a staggered relationship between layers. As each layer comprises two interconnected and overlaid helices which are generated around the godet serving as a framework, the actual structure of the sleeve more closely resembles that shown in the side view of FIGURE 10 with each layer contained for a variable part of its length within the layer assembled immediately after it and to which it is linked.

Thus, layer 57 is contained for part of its length within layer 56, the two layers being linked through the continuation of a component helix of layer 57, as one of the helices, of opposite hand, in the layer 56. An arrangement such as that shown in FIGURES 9 and 10 makes for good frictional intraction between the overlaid layers and this assists the removal of the sleeve as an integrated structure with a retention of staggered relationships between successive layers.

The loss of the support afforded by the godet as a layer moves away from it, results in a collapse of the serially connected helices of which it is composed. Simultaneously, with their collapse the helices within the layer are extended in an axial direction under the impetus imparted by the pulling action of the wind-up device. The summation of this axial elongation and collapse of the helices results in the formation of a structure comprising 2 limbs, each derived from a component helix of the layer, which are interlaced and thereby stabilised, owing to the limbs crossing one another at a variable number of points along their length.

Structures of this general type will for convenience be referred to herein as loops and each loop constitutes an axially-extending segment in the resulting yarn.

Figure 11:
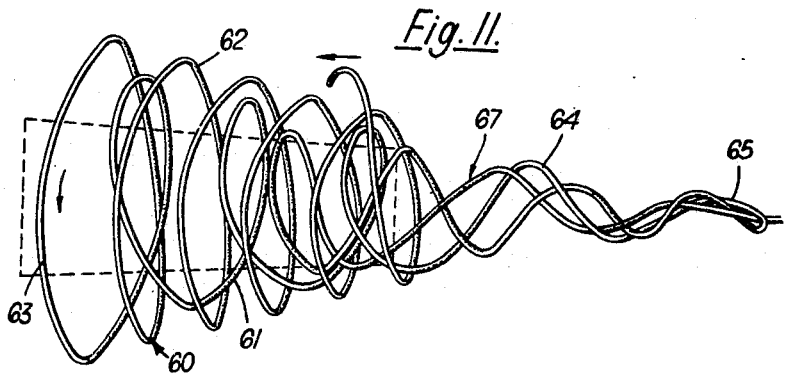
FIGURE 11 is a diagrammatic view illustrating in more detail, and in a somewhat idealised manner, the relationship between two layers of the sleeve in the region where the sleeve is moving off the rotatable body.

FIGURE 11 illustrates the structure of the layers assembled around the godet, the relationship between two layers and the collapse of one of them as it moves off the godet and its elongation into a loop which constitutes an axially-extending segment in the resulting yarn.

Referring to FIGURE 11, a newly deposited layer 60 comprises two helices 61 and 62, spread out over the length of the godet with the left-hand helix 62 overlying the right-hand helix 61 and the helices serially connected at the extreme left-hand end of the godet through the common chord 63 which constitutes the trailing end of layer 60.

Each of the helices contains five turns and two turns 64 and 65 at the forward end of the first laid helix 61 have moved off the godet under the influence of the tractive effect, exerted by the layer 67 deposited on the godet immediately previously to the layer 60.

The layer 60 is connected at its loading end 66 to the layer 67. The layer 67 which likewise comprises two serially connected, five turn helices has, except for the trailing end, entirely moved off the godet surface. In moving off the retaining surface of the godet, the layer 67 collapses in the vertical direction and is elongated in the longitudinal direction thereby forming a long loop with interlaced limbs owing to the intercrossing of the limbs which occurs at the five nodal points (a–e) and which correspond to the points in the initial layer, where one helix crossed over the other.

It will be appreciated that FIGURES 9-11 are diagrammatic and somewhat idealistic for, in actual operation, the sleeve built up on the godet normally contains many more layers, and having regard to their number, the fineness of the filaments and the speeds involved, it is impossible to determine with complete accuracy or to record the structure of the sleeve, and the complex series of events which occur during its withdrawal.

However, high speed photographs and experiments with model systems verify the essential validity of the analysis of the sleeve structure and the explanation of the phenomena occurring during its withdrawal which is provided hereinbefore. In particular, they verify that a plurality of layers accumulate on the godet so as to form a sleeve, that there is a progressive and generally orderly advancement of the sleeve down and off the godet with the layers moving approximately in the order in which they were deposited but with the whole assembly moving as an integrated and coherent structure. The high speed photographs and the experiments with model systems, also confirm that the departure of the layers from the godet surface is marked by their collapse and axial elongation into long loops of complex structure.

The removal of the sleeve in an orderly and progressive manner implies that the layers are arranged therein in a superimposed but staggered relationship and it is the retention of this arrangement during and subsequent to the withdrawal which endows the yarn with its characteristic structure and some of its advantageous properties.

Owing to the rapidity of events, a number of layers will move off the godet surface practically instantaneously, although overall the staggered relationship will be maintained, so that a strand of more or less axially-extending loops, each of which constitutes a segment in the resulting yarn is formed.

Figure 12:
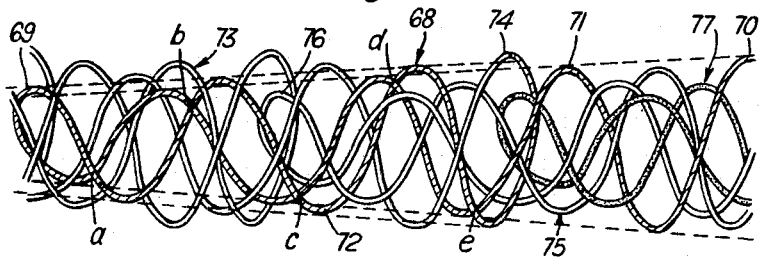
FIGURE 12 is a diagrammatic view at a greatly enlarged scale of a section of the strand of loops devised from the sleeve after it has moved off the rotatable body and it illustrates the relationship between the various loops of which it is comprised and the structure of the individual loops.

FIGURE 12 shows a diagrammatic view, at an enlarged scale of a small section of a strand of loops derived from a sleeve containing layers similar to the two layers shown with reference to FIGURE 11.

One loop 68, has its closed end 69 at the extreme left-hand and of the section and extends along it to terminate in its leading end 70. One limb 71 of the loop, because it derives from an underlying helix in the initial layer extends slightly further forward than the other limb 72 of the loop. The two limbs of the loop are interlaced owing to the crossing of limbs which occurs at the five model points (a-e). This interlacing interlocks the limbs and no stabilises the loops, and is attributed to the formation of the loop from a layer which comprises two serially connected overlaid helices of opposite hand. The number of nodal points present corresponds to the number of turns within each helix of the layer.

The retention during and subsequent to the withdrawal of the superimposed but staggered relationship between layers of the sleeve is reflected in the structure of the strand of loops. Thus, the loop 68 is contained within another axially-extending loop 73 derived from the next succeeding layer within the sleeve and the two loops are interconnected at the leading end 74 of the loop 68. The limbs of the loop 73 are interlaced in a similar manner to those for the loop 68. Moreover, loop 68 itself envelops another loop 75, the closed end 76 of which lies approximately midway along loop 68. This loop also contains within it another loop 77, part only of which is shown. The general picture is that of a nest of axially-extending interconnected loops which have a complex structure. Loops within the strand are rarely so uniformly arranged as the diagrammatic illustration of FIGURE 12 suggests, but despite a certain degree of disclocation and arrangement for reasons which will be outlined hereinafter, the configurations adopted by the loops as shown in FIGURE 12 occur with sufficient constancy to provide cross-sections taken at random intervals along the length with approximately the same number of filaments.

The number of filaments in the cross-section corresponds to the peripheral speed of the godet and the lower speed at which the seleve is withdrawn therefrom multiplied by the number of filaments passed to the godet. For example, if the peripheral speed of the godet is 10,000 f.p.m. and the sleeve withdrawn therefrom at a linear speed of 250 f.p.m., there will be, assuming one filament was passed to the godet, 10,000/250 or approximately 40 filaments at any point along the strand.

Some loops of the strand may not be confined to the distinct array formed by the nest of interconnected loops but may escape therefrom for the greater part of their length to be located around the nest in a more or less random manner, although they frequently are wrapped loosely around it for a number of helical turns.

Moreover, the structure of the strand of loops is always modified by the presence, in addition to the nest of interconnected loops and any long loops which may have escaped therefrom of a variable number of generally shorter-length loops which emerge from the axially-extending loops, and extend outwardly therefrom.

Any loops which emerge out of the nest of interconnected loops in both the strand of loops and in the yarn derived therefrom will be referred to herein as pedicled bights to distinguish them from the axially-extending loops within the nest. The pedicled bights thus comprise any loops which any have escaped from the definite arrangement of interconnected, axially-extending loops and loops which result from the displacement of helical turns in a layer within the sleeve while it in on the godet. Pedicled bights comprising the latter kind of loop are often of shorter length than the others, but when both are present in the strand or yarn they are generally indistinguishable.

Figure 13:
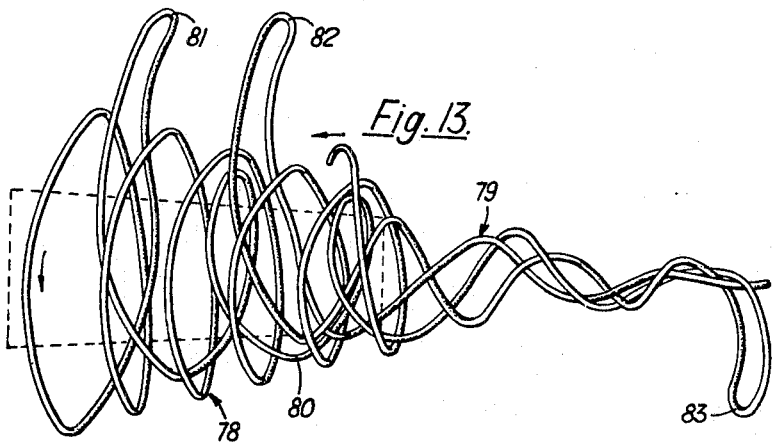
FIGURE 13 is a diagrammatic view similar to that shown in FIGURE 11 but illustrating how the layers comprising the sleeve may be modified under the operating conditions and probably more closely approximates the structure which is most frequently present in the sleeve.

The shorter-length pedicled bights are formed primarily in the sleeve built up around the godet, when the centrifugal force arising from the rotation thereof tends to throw loosely-wrapped individual turns of helices outwards from the godet surface. The effect which the centrifugal force may have on individual layers of the sleeve with the formation of variously sized but generally short-length loops which provide pedicled bights in the strand of loops is illustrated in the diagrammatic and idealised FIGURE 13 which, apart from the modification with the layers arising from the centrifugal force, corresponds to FIGURE 11.

Referring to the figure, it can be seen that under the influence of the centrifugal force, a turn of the inner helix 80 of the layer 78 has been thrown outwardly so that it projects out of the layer as a short-length loop 81. Likewise, short-length loop 82 is formed from the trailing end of the inner layer 79. When the layers move off the godet surface to form a strand of loops, the short-length loops 81 and 82 will extend outwardly from the main body which is formed by the axially-extending loops, as pedicled bights. One much pedicled bight is indicated by reference numeral 83.

Although the centrifugal force to which individual layers within the sleeve on the godet are subjected, is the primary agency in forming this type of pedicled bights, other factors such as the godet profile also contribute to their formation. In practice, pedicled bights are always present in both the strand of loops and the yarn derived from it, but their actual number may vary enormously. Hence it is possible to produce a variety of structures, differing in the number of pedicled bights, which may range from a relatively few to a multitude, and the arrangement of the pedicled bights around the nest of axially-extending loops.

Figure 14:
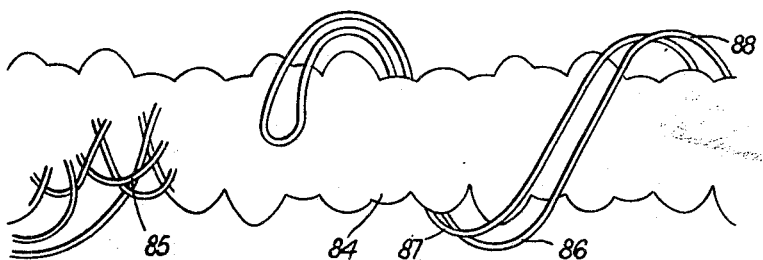
FIGURE 14 is a diagrammatic view of a length of a strand of loops which is itself derived from a sleeve wherein the layers are modified as shown in FIGURE 13.

FIGURE 14 is a diagrammatic view at a greatly enlarged scale of part of the strand of loops and the structure shown approximates more closely than the structure of FIGURE 12 to that commonly obtained in the operation of the process of this invention.

The strand comprises a central region 84 which consists of a nest of interconnected, axially-extending loops which, since they correspond to those shown in the strand of FIGURE 12, have not been indicated in detail. Pedicled bights 85 of the shorter-length kind emerge from the central region and extend outwardly therefrom while a longer-length pedicled bight is formed from the lengths 86 of a long loop which is not confined in the arrangement of the central region but is wrapped for a number of turns around it. The limbs of the loop are interlaced at nodal points, two of which are shown at 87 and 88.

As the sleeve moves off the godet, twist is inserted therein and this twist condenses the strand of loops formed from the sleeve into a bulky yarn.

The twist insertion is a result of the rotation of the godet relative to the linear movement of the strand of loops and it arises because at come stage in their withdrawal from the godet, the layers within the sleeve are located partly on the godet and partly in the strand of loops which has moved away therefrom under the impetus imposed by the wind-up device. With one end restrained in the strand which is itself held by the wind-up device, the other end is rotated by the godet and consequently twist is inserted in the strand. The twist inserted runs down the strand until it encounters a twist barrier.

On the withdrawal of the sleeve from the godet, the short length loops which are generally present and which project outwardy from the godet owing primarily to the action of the centrifugal force, may not be carried into the main strand of loops and hence they are twisted not at all or to a lesser degree than the axially-extending loops within the strand. These short-length loops are present in the strand and the yarn as pedicled bights.

Figure 15:
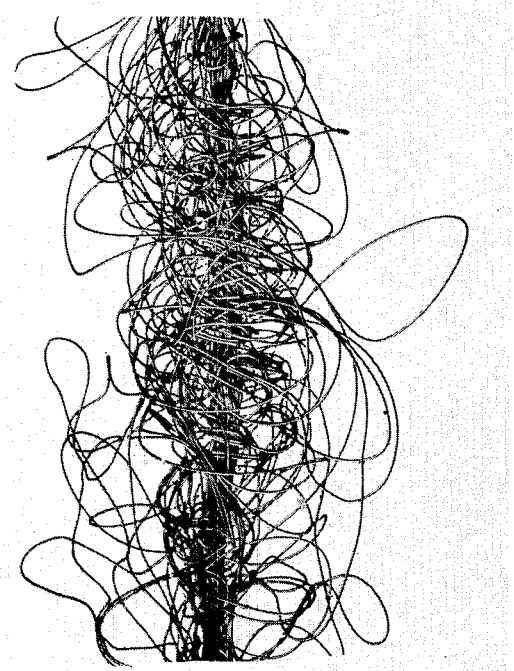
FIGURE 15 is a photograph of a model of a length of yarn made in accordance with this invention as it was observed under a ordinary microscope.

FIGURE 15, as previously indicated, is a photograph of a model which actually reproduces the structure of a short length of yarn made in acordance with this invention as it was observed under a microscope. So numerous are the pedicled bights in this yarn that they form a discontinuous peripheral region 92 around a relatively more compact core 91.

The core comprises a concatenation of interconnected loops, each of which constitutes a segment, aligned essentially parallel to the long axis of the yarn but with the loops twisted together in more or less regular helices with a helical angle of around 70°.

Cross-sections taken at random along the lengths of the yarn show an approximately constant number of filaments in the core. The number of filaments found is related to the linear speed (E) at which the filaments meet the godet, their number (N) and the linear speed (W) at which the loops are withdrawn from the godet. The number can be found by multiplying the ratio $E/W \times N$. The cross-sections frequently show in addition to the parallel filaments which represent the limbs of the loop, the curved end of one or more loops.

The loops within the core, owing to the progressive and orderly manner in which the sleeve is moved off the godet, are arranged so that the majority of the loops are contained for at least part of their length within another loop, and with a general advancement of the loops along the yarn. It should be appreciated that the axial arrangement of the loops within the core is more complex than the above description thereof, and, in particular, there is considerable entanglement between adjacent loops which may distort the nest of interconnected loops, although overall the nest arrangement is retained. The overall general picture is that of a nest of interconnected loops, each containing a segment, aligned in a direction essentially parallel to the long axis, although helically twisted in that direction. The various loops are stabilised by the interlacing of the component limbs.

The peripheral region 92 which constitutes a discontinuous shell around the core 91 comprises a multiplicity of pedicled bights which emerge from the relatively compact core and which extend outwardly therefrom in a more or less random array.

In the yarn represented by FIGURE 15, it is apparent that a number of the pedicled bights are arranged for at least part of their length around the core 91. Some of the pedicled bights which are loosely wrapped in this manner are indicated by reference numeral 93. Other pedicled bights project outwardly from the core 91 in radial directions and the general impression is that of a random array of heterogenous, closed end loops forming a network around a relatively compact core.

The yarn shown in FIGURE 15 has a structure which is representative of many yarns made in accordance with this invention. However, although pedicled bights are invariably present in the yarns of this invention, they need not be so numerous as in the structure shown in FIGURE 15. In some yarns of this invention, there are not sufficient pedicled bights present to form a distinct peripheral region, and the structure is composed essentially of a nest of interconnected axially-extending segments.

Furthermore, although the pedicled bights are always present to a variable extent in the yarn when it is initially formed, they may subsequently be removed therefrom by, for example, cutting or singeing. A practical process for removing pedicled bights from the as-formed yarn comprises bringing the yarn into close proximity to a red-hot wire. The singeing treatment markedly reduces the number of pedicled bights and gives the yarn which consists essentially of a nest of axially-extending segments, each of which comprises a loop.

A characteristic feature of the yarn represented in FIGURE 15 as with all the yarns of this invention, is its bulkiness, i.e. relative volume occupied by a given weight and the irregular nature of its surface as a result of the presence of a peripheral shell containing a more or less random array of loops.

The bulkiness is a reflection not only of the readily visible loops arranged in a random array at the surface of the yarn, but also the structure of the core wherein loops which are of a complex structure and which are comparable to the staple fibres in a spun staple yarn nest one within another with some integrated entanglement between them. Because of their bulky nature, the yarns have an excellent covering power and fabrics made from them have good warmth. The irregular surface of the yarns gives them a handle or feel similar to that of spun yarn made of comparable staple length fibres.

As the twist inserted in the strand of loops is a function of the rotary movement of the godet relative to the linear speed at which the bundle is moved away by the wind-up device it is determined by the operating conditions at which the apparatus is employed. Thus, for example, if the filaments are passed to the godet at a speed of 10,000 feet per minute, and the sleeve formed thereon is then caused to rotate at 15,000 r.p.m. through rotation of the godet at this speed, before being pulled from it and wound-up at a speed of 250 feet per minute, the twist insertion rate is $$\frac{15,000}{250 \times 12}$$

t.p.i. or 5 turns per inch.

Hence the amount of twist which is inserted, and which imparts to the yarn the necessary coherency and stability, can be controlled in a simple and effective manner. The optimum twist for best properties in the yarn is dependent upon the denier thereof and the relationship between those two parameters is concisely expressed by means of the twist factor. This is defined (see, for instance, Textiles Terms and Definitions, 4th Edition, published by the Textile Institute, Manchester,) as the actual twist divided by the square root of the cotton count and the cotton count is related to the denier.

The most satisfactory yarns of this invention have a twist factor in the range between ¾ and 10 and most usually between 1 and 4. The direction of the twist which is inserted depends upon the direction in which the godet is rotated.

At very low twist levels the yarn may be drafted down to lower deniers by conventional means.

The apparatus described with reference to FIGURE 1 is, from a technical standpoint, a false twist apparatus, since neither the spinneret nor the package on which the yarn is wound up rotates about the yarn axis, yet the yarn which is wound must be considered as possessing real twist. Certainly, it is virtually impossible to remove any appreciable amount of twist from the yarn by the application of tension thereto and the yarn is a stable product which can be wound up in a conventional packaging and stored indefinitely.

The invention will now be illustrated by the following specific examples which are not to be construed as limiting the scope thereof.

In these examples, the bulk factor was determined in the following manner.

Five turns of the yarn were wound under a tension of 0.01 gms. per denier around a flat plate 1 mm. thick and 10 cms. long, with the loops of the winding spaced apart a distance of 2½ mm. The plate was supported on the stage (¾ inch diameter) of a thickness gauge with the loops of the yarn lying symmetrically across the stage. The top plate (¾ inch diameter) of the gauge was then lowered onto the yarn under a load of 10 gms. and the gauge reading taken at a steady value. The loading was then increased to 50 gms. and the gauge was again read when steady.

The higher the percentage difference between the two readings, the more residual voids were present in the yarn after the initial compression, and this was a reflection of the complexity of structure and the presence of spaces between filaments. The percentage is high with bulky yarns and hence the result obtained from this test can be considered as a measure of bulkiness of the yarn being tested.

EXAMPLE 1

Polyhexamethylene adipamide having a relative viscosity of 35 was extruded through 0.009 inch diameter orifices in the spinneret 13, at a spinning temperature measured at the spinneret of 273° C. and at a rate of 0.05 lb. per hour per orifice.

One of those filaments was passed through the filament guide in the sinusoidal traverse mechanism shown in FIGURE 5 which operated at a frequency of 50 cycles per second and had an amplitude of 1.5 inches and then wound around the frusto-conical shaped godet having the same dimensions as the godet shown in FIGURE 2. The godet, which was driven by an electric motor at a speed of 18,000 r.p.m. which gave a peripheral speed of 9,200 f.p.m., was located 26 inches below the spinneret face and 2 inches below the traverse mechanism. The filament was wrapped around the godet in the form of a succession of layers each of which, in this particular example, had the form illustrated in FIGURE 7, namely two serially connected helices, laid in opposite directions over a length of 1½ inches of the godet surface with one overlapping the other. Each helix contained 3 turns of the filament so that 6 turns were laid for a complete traverse. The diameter of the resulting tapered tubular sleeve 15 was 2.5 inches at its widest part and 1.4 inches at its narrowest.

Although the peripheral speed of the godet varied as the filament traversed the one and a half inches along its length in the direction from the skirt to the none, we found that the denier and birefringence of the filament so traversed was substantially constant at all points along the laid length.

The lack of cyclic variations in denier and birefringence of the filaments wound onto the godet is probably explained on the basis that the fluctuations from maximum to minimum peripheral speed along the godet take place so rapidaly that they are evened out by the inherent elasticity of the supply filament and do not affect the attenuation and orientation which are predominantly localised in the region where the filament is in a highly transitional plastic state. The birefringence measurements showed that the filament wound on the godet was reasonably well oriented.

The sleeve was continuously pulled off the godet along the longitudinal axes thereof, when it extended and subsequently collapsed into a strand of loops which was twisted into a yarn 19, in which form it was wound up at a rate of 110 f.p.m. via a stationary guide placed on the axis of the godet and one inch away from its nose.

The sleeve was pulled off the godet without the assistance of mechanical means other than the wind-up.

The yarn which possessed 13 t.p.i. had the following properties:

Denier _____ 118
Breaking strength _____gms__ 160
Extensibility _____percent__ 30

Individual filaments in the yarn were present as loops which had a length varying up to 18 inches and had a birefringence of 0.036 and a denier of 1.4.

The yarn which had the appearance of a medium twisted cotton yarn, possessed good covering power, could be readily dyed and fabrics made therefrom had a soft and pleasant handle and did not yellow to any appreciable extent when heat set. Furthermore it had excellent bulk and loft characteristics.

EXAMPLE 2

Polyhexamethylene adipamide having an inherent viscosity of 0.882 (measured in 90 percent phenol/water at 25° C. and a concentration of 0.5 percent) and containing 0.03 percent titanium dioxide was extruded through 0.009 inch diameter orifices in a spinneret at a rate of 0.05 lb. per hour per orifice at a spinning temperature measured at the spinneret of 273° C. into ambient air at 20° C.

One of the polyhexamethylene adipamide filaments was passed along a generally defined downward path to a godet positioned slightly off set from the spinneret and at a distance of 38 inches from its face. The godet was profiled so as to resemble the bullet-nose shaped godet shown in FIGURE 3 and it had the following dimensions.

Inches
Maximum diameter (skirt) _____ 3½
Minimum diameter (nose) _____ ¾
Axial length _____ 2½
Angle of declination, 40°.

The godet was attached through its stem to an electric motor by means of which it was driven at 18,000 r.p.m. when its peripheral speed was 9,400 f.p.m. Before passing onto the godet the filament was lead through the thread guide in the traverse bar of the traverse mechanism shown in FIGURE 6 with the traverse bar lying in a horizontal plane normal to a vertical plane through the longitudinal axis of the godet. The traverse mechanism was located 2 inches above the surface of the godet and operated at a traverse frequency of 2,000 cycles per minute and an amplitude of 1.5 inches.

Stringing up of the process was effected in the following manner.

The filament after extrusion from the spinneret, and after it had substantially completely solidified, was introduced into an aspirator jet of conventional design and the impetus which it imparted to the filament applied tension to it. The jet was then moved down to a position below the godet rotating at its operating speed and the filament carried down by the jet was lead through the thread guide in the traverse bar which was at rest.

The filament was then wrapped manually around the godet surface which caused the filament to break above the aspirator jet, and the traverse mechanism was simultaneously set in motion. Thereafter, the godet pulled the filament down upon itself and because of the action of the traverse mechanism an approximately tubular shaped sleeve was propagated around the godet. The circumference of the sleeve at its narrow end was pulled away through a ceramic guide eye to a constant speed wind-up device. The wind-up device which operated at 20 f.p.m. imparted a substantially constant tension to the sleeve and consequently an equilibrium was soon attained between the formation of the sleeve on the godet and its withdrawal in the form of a strand of loops. No mechanical means other than the wind-up device was required to withdraw the sleeve from the godet. Twist was inserted in the strand of loops to condense it into a yarn and to impart to the yarn a necessary coherency and stability. The yarn was then wound into a package on a bobbin.

Some of the properties of the yarn which were determined are listed below:—

Denier _____ 135
Twist (t.p.i.) _____ 18.75
Twist factor _____ 3
Tenacity (gms./denier) _____ 2.85
Extensibilities (%) _____ 65
Bulk factor (%) _____ 35

Individual filaments in the yarn had a mean denier of 1.3 and a birefringence of 0.039.

Figure 16:
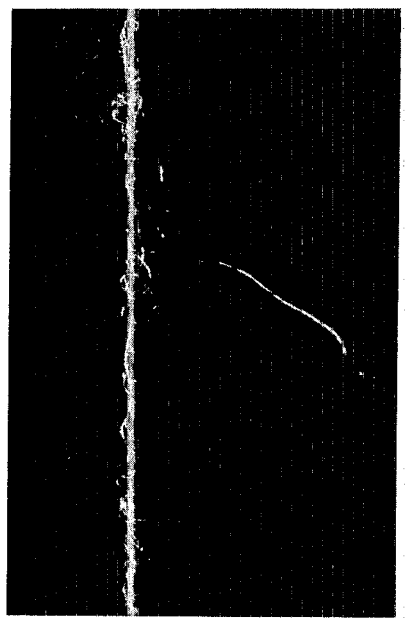
FIGURES 16–18 are photomicrographs at a magnification of X10, of length of yarn made in accordance with the procedure set forth in various examples hereinafter.

The yarn, a photomicrograph of a length of which is shown in FIGURE 16, resembled in appearance and feel a yarn spun from polyhexamethylene adipamide staple fibres and its bulk as expressed by the bulk factor was greater. The photomicrograph shows that the yarn contains relative few pedicled bights.

EXAMPLES 3–6

Employing the apparatus assembly of Example 2 operating at the same speeds, yarns were made from several filaments, derived from the same polyhexamethylene adipamide used in that example. The number of filaments passed to the godet in each case and some of the properties of the yarns which were obtained are reported in Table 1 which follows:

EXAMPLE 6

Figure 18:
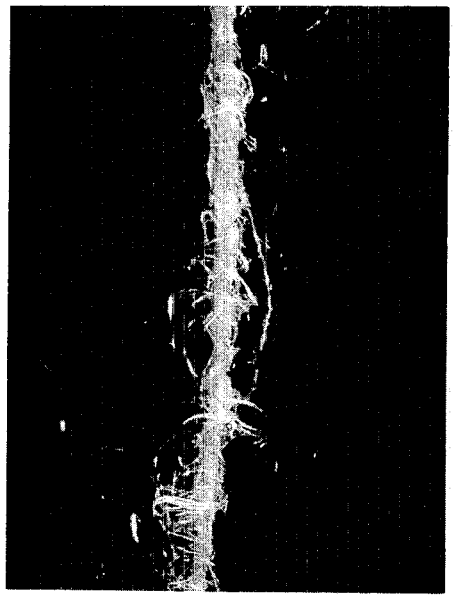

A photomicrograph of a length of the yarn is shown in FIGURE 18. Once again there are numerous pedicled bights 99 arranged around a core 97. The pedicled bights appear to be more randomly arranged than those in the yarn of Example 4 although some of them, for instance those indicated by reference numeral 98 are loosely wrapped for a number of turns.

EXAMPLE 7

The apparatus of Example 2 was employed in the preparations of yarns composed of polyethylene terephthalate filaments. The pertinent dimensions and distance were the same as in that example.

Polyethylene terephthalate having an inherent viscosity of 0.675 (measured in orthochlorophenol at 25° C. and at a concentration of 0.8%) and containing 0.3 percent titanium dioxide as a delustrant was extruded into filaments at a spinning temperature of 280–290° C. Three of the polyethylene terephthalate filaments were lead through the traverse mechanism operating at 2,000 cycles per minute and an amplitude of 1.5 inches onto the godet rotating at 18,000 r.p.m. The sleeve formed on the godet and which comprised a plurality of interconnected helices arranged in superimposed layers was continuously pulled off the godet by a constant speed wind up device along the axis of rotation thereof, when it collapsed and simultaneously elongated in the axial direction into a strand of loops. This strand of loops was twisted into a yarn in which form it was wound up at a rate of 120 f.p.m.

The yarn so obtained had the following properties.

Denier _____ 1490
Twist (t.p.i.) _____ 12.5
Twist factor _____ 6.55
Tenacity (gms./denier) _____ 0.15
Extensibility (%) _____ 92.7
Bulk factor (%) _____ 15.9

TABLE 1

| Example | No. of Filaments | Denier | Yarn Properties | | | | | Filament Properties | |
|---|---|---|---|---|---|---|---|---|---|
| | | | Twist (t.p.i.) | Twist Factor | Tenacity, gms./den. | Extensibility, Percent | Bulk Factor, Percent | Denier | Birefringence |
| 3 | 2 | 296 | 18.75 | 4.4 | 1.13 | 61.4 | 5.4 | 1.3 | 0.039 |
| 4 | 4 | 642 | 18.75 | 6.5 | 1.19 | 84.2 | 3.1 | 1.1 | 0.037 |
| 5 | 6 | 947 | 18.75 | 8.14 | 1.16 | 87.3 | 3.5 | 1.3 | 0.038 |
| 6 | 8 | 1223 | 18.75 | 8.92 | 0.64 | 86.1 | 4.2 | 1.4 | 0.039 |

NOTES OF TABLE 1

EXAMPLE 3

The yarn had the handle and feel of a spun yarn made from polyhexamethylene adipamide staple fibres, and it could be woven into a fabric possessing a good warmth.

EXAMPLE 4

Figure 17:
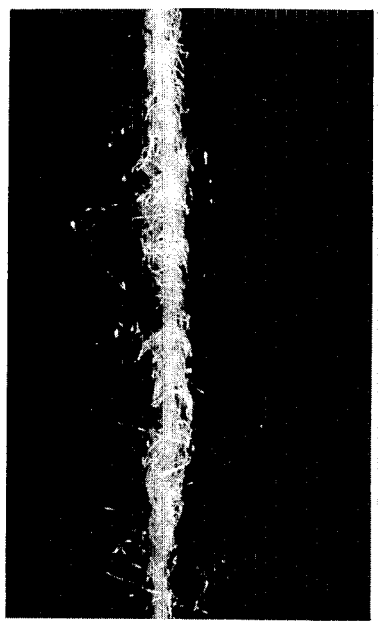

A photomicrograph of a length of the yarn is shown in FIGURE 17. Compared with the yarn of Example 2 which was derived from one continuous filament it contained many more pedicled bights. There was a distinct arrangement of the pedicled bights as a loose wrapping 96 around a more compact core 55. The pedicled bights could be reduced in number by singeing, or by passing it over a red hot wire, or by cutting, as they would be wrapped more tightly around the core by passing the yarn through an air vortex.

EXAMPLE 5

The yarn of this example had a bulk, as expressed by the bulk factor, comparable to that of an equivalent spun staple yarn.

Individual filament in the yarn had a denier of 7.9 and a birefringance of 0.012.

EXAMPLE 8

The apparatus of Example 2 except for the replacement of the spinneret by a screw extruder was employed in the preparation of yarns composed of polypropylene filaments. The pertinent dimensions and distances are the same as in that example.

Polypropylene having an inherent viscosity of 1.40 (measured in Decalin at 135° C. and at a concentration of 0.5%) and containing 0.3 percent titania as a delustrant was extruded through the 0.024 with diameter orifices in a screw extruder at a rate of 0.05 lb./hr. orifice at a spinning temperature of 220° C. into ambient air at 23° C. One of the polypropylene filaments spun in this way was lead through the traverse mechanism onto the godet. The operating conditions for the traverse device and the godet were the same as in Example 2.

The sleeve formed on the godet was continuously pulled away therefrom along the axis of rotation and the yarn which formed was wound up at a speed of 70 f.p.m. The yarn had the following properties.

| | |
|---|---|
| Denier | 762 |
| Twist (t.p.i.) | 21.4 |
| Twist factor | 8.38 |
| Tenacity (gms./denier) | 0.48 |
| Extensibility (%) | 124.5 |
| Bulk factor (%) | 9.4 |

Individual filament in the yarn had a denier of 5.7 and a birefringence of 0.023.

The yarn had the handle and feel of a yarn spun from polypropylene staple fibres and it had a greater bulk than a comparable staple fibre yarn.

EXAMPLE 9

The procedure of the previous example was repeated except that two polypropylene filaments instead of one were passed through the traverse mechanism onto the godet.

The yarn obtained had the properties listed below:

| | |
|---|---|
| Denier | 1060 |
| Twist (t.p.i.) | 21.4 |
| Twist factor | 8.69 |
| Tenacity (gms./denier) | 0.63 |
| Extensibility (%) | 139 |
| Bulk factor (%) | 11.0 |

The individual filament denier was 2.8 and they had a birefringence of 0.021.

EXAMPLES 10-12

Employing the apparatus assembly of Example 2, yarns were prepared from the various melt-spinnable polymers reported in Table 2 which also included the relevant operation conditions and some of the properties of the yarns.

All the polymers contained 0.3 percent titanium dioxide as a delustrant, and the inherent viscosities of the polymers were measured in the same manner as the polyhexamethylene adipamide of Example 2.

thalate, cellulosics, such as cellulose acetate or triacetate, polyacrylics, vinyl polymers, vinylidene polymers, polyurethanes, polyhydrocarbons, and so on. Composite filaments and filaments derived from blends of polymeric materials may also be used.

Preferred among these polymers are the melt-spinnable ones, which are drawn at spinning and in the same operation by which they are pulled down onto the rotating body.

While the present apparatus and process are suitable for operation with filaments having a normal cross-section such as those produced where a spinneret having a circular shaped orifices is employed for the spinning thereof, filaments having a non-circular cross-section are also suitable, for instance the trilobal shaped polyhexamethylene adipamide filaments of Example 10, and may impart desirable effects to fabrics derived therefrom.

An acceptable yarn with good bulk characteristics can be derived from a single filament although many more filaments, generally not more than 50, can also be employed.

From the foregoing, it will be appreciated that the advantages of this invention are manifold. The bulky yarns, and the fabrics into which such yarns are made up, will tend to have these properties, notably handle or feel, covering power and warmth, normally associated with spun staple yarn structures. In addition, the properties inherent in the material forming the continuous filaments will be present, for example, the hard wearing, good strength and no-rotting characteristics associated for example with polyamide yarns and fabrics. The yarns can readily be handled by conventional textile machinery and have been woven and knitted into useful fabrics. The fabrics, on account of the bulk of the yarns from which they are made, have a good warmth and covering power.

The bulky yarn is simply and economically prepared by a process which only requires extremely simple equipment and which is fully integrated with the spinning of the continuous filaments from a source material. The process utilises extremely fine denier continuous filaments to produce a bulky yarn of a greatly enhanced denier containing numerous filaments in its cross-section and one in which the bulkiness is inherent in its construction and is stable in the subsequent processing of the yarns into fabrics without the necessity of a heat-setting treatment.

TABLE 2

| | | Spinning conditions | | | | | |
|---|---|---|---|---|---|---|---|
| Example | Polymer | I.V. | Spinning temp. (° C.) | Rate, lbs./hr. orifice | Filament shape | No. of filaments | Traverse frequency, c.p.m. |
| 10 | Polyhexamethylene | 0.982 | 290 | 0.05 | Trilobal | 3 | 2,000 |
| 11 | Polyepsilon caprolactam | 0.810 | 270 | 0.06 | Circular | 2 | 2,000 |
| 12 | Polyhexamethylene suberamide | 0.851 | 280 | 0.06 | do | 3 | 2,000 |

| | Peripheral speed of godet, ft./min. | Wind-up speed (ft./min.) | Yarn properties | | | | Filament properties | |
|---|---|---|---|---|---|---|---|---|
| Example | | | Denier | Tenacity (gm./den.) | Extensibility percent | Bulk factor, percent | Denier | Birefringence |
| 10 | 9,200 | 80 | 389 | 0.87 | 74.8 | 8.1 | 1.7 | 0.035 |
| 11 | 9,200 | 80 | 310 | 0.90 | 65.3 | 9.3 | 1.3 | 0.036 |
| 12 | 9,200 | 80 | 437 | 1.05 | 86.2 | 8.1 | 1.2 | 0.042 |

NOTES ON TABLE 2

EXAMPLE 10

The yarn which contained 18.75 turns per inch of twist had an enhanced sparkle due to the trilobal shape of the constituent filaments.

EXAMPLES 11 AND 12

The yarns had the handle and feel of a spun yarn made from the equivalent staple fibre.

Many types of filaments are suitable for the yarn of this invention and the process described has been operated successfully for the production of balky continuous filament yarns from a wide variety of polymeric materials. For example, suitable filaments are prepared from fibreforming polyamides such as polyhexamethylene adipamide, polyepsilon caprolactam and poly-omega-aminoundecanoic acid, polyesters, such as polyethylene terephthalate,

EXAMPLE 13

A polyhexamethylene adipamide filament made in the manner set forth in Example 2 was processed into a yarn using the apparatus assembly of that example. The godet was rotated at a constant speed of 18,000 r.p.m. and the sleeve formed therein withdrawn along the axis of rotation and wound up as a yarn at a speed of 80 f.p.m. During the operation of the process the traverse frequency was reduced in stages by alteration of the rotational speed of the motor driving the crank and the effect of the various traverse speeds in the process and the resulting yarn was determined. The conclusions are summarised in Table 3 below.

TABLE 3

| Traverse frequency, cycles per minute | Process | Nature of yarn |
|---|---|---|
| 4,500 | Smooth running—good withdrawal of sleeve in an orderly and progressive manner. | Fairly regular with a moderate number of pedicled bights. |
| 3,000 | do | Still fairly regular but contains more pedicled bights. |
| 2,000 | do | Less regular yarn. The pedicled bights are more numerous. |
| 1,000 | "Snatching" during withdrawal and less ordered withdrawal. | Yarn begins to retain a slubbed appearance. Very much less regular. |
| 600 | Snatching very prevalent and so that continuous running difficult. | Yarn very slubby in appearance. Yarn breakage occurs at thin places in the yarn. Completely irregular and of limited utility. |

What we claim is:

1. A process for making a yarn which comprises forming continuous filaments by the extrusion of a synthetic polymeric material, passing one or more of said continuous filaments so formed to a rotating body around which said filament or filaments is or are wrapped, and having a peripheral speed which is sufficient to apply tension to, and to attenuate said continuous filament or filaments being passed thereto, imparting to said filament or filaments in the course of its or their passage to the body a reciprocating movement of at least 600 cycles per minute whereby said filament or filaments is or are moved back and forward along the body so as to form a sleeve, continuously withdrawing the sleeve from said body in a direction along its axis of rotation and at a speed less than the peripheral speed of the body so as to insert twist, and collecting the yarn so obtained in an orderly manner.

2. A process as claimed in claim 1, wherein said rotating body macromolecularly orients said continuous filament or filaments in addition to applying tension to it or them.

3. A process as claimed in claim 1 wherein said sleeve is continuously withdrawn from said body in a direction parallel to its axis of rotation.

4. An apparatus for making a continuous filament yarn which comprises means for extruding a synthetic polymeric material into one or more continuous filaments, a traverse mechanism located some distance away from said extrusion means and arranged to impart a reciprocating movement to said filament or filaments of at least 600 cycles per minute, a body arranged to rotate with a peripheral speed sufficiently high to apply tension to said filament or filaments and to assemble said filament or filaments around it and means for withdrawing said assembly at a slower speed than the peripheral speed of said rotatable body so as to insert twist and for collecting the yarn so obtained.

5. An apparatus as claimed in claim 4 wherein the rotatable body tapers in the direction in which the assembly is withdrawn therefrom.

References Cited

UNITED STATES PATENTS

| 2,202,118 | 5/1940 | Newman et al. | 57—140 XR |
| 2,231,815 | 2/1941 | Newman et al. | |
| 2,369,481 | 2/1945 | Modigliani. | |
| 2,854,814 | 10/1958 | Burkholder | 57—157 XR |
| 2,886,877 | 5/1959 | Frickert et al. | 57—140 XR |
| 3,217,482 | 11/1965 | Baer | 57—34 XR |

FOREIGN PATENTS

| 53,817 | 9/1946 | France. |
| 299,889 | 7/1929 | Great Britain. |

STANLEY N. GILREATH, Primary Examiner

WERNER H. SCHROEDER, Assistant Examiner

U.S. Cl. X.R.

57—34, 138, 157